Dec. 10, 1968 J. ABRUZZO ET AL 3,416,144

EFFICIENT BUFFER STORAGE

Filed April 30, 1965

INVENTORS
JOSEPH (NMI) ABRUZZO
ANDREW PAUL COX, JR.
ROBERT H. SAPP

ATTORNEYS 3,416,144
EFFICIENT BUFFER STORAGE

Joseph Abruzzo, Severna Park, Andrew Paul Cox, Jr., Lutherville, and Robert H. Sapp, Baltimore, Md., assignors, by mesne assignments, to the United States of America as represented by the Secretary of the Navy Filed Apr. 30, 1965, Ser. No. 452,421
1 Claim. (Cl. 340—173)

ABSTRACT OF THE DISCLOSURE

A buffer store for a digital computer which may be used to store inputs from outside the computer and also as temporary scratch-pad storage registers for holding computed values.

The present invention relates to computer apparatus and more particularly, to an efficient buffer storage and specifically, to an efficient buffer storage for special purpose digital computers.

Digital systems which are large enough to be comprised of separately packaged sub-units which must communicate with each other, usually require that a significant amount of hardware be present in the form of registers which temporarily hold the information being communicated. These registers are normally referred to as buffer registers. It is desirable in this environment that a buffer storage be provided which may be used efficiently as both buffer stores for inputs from the outside system to the computer system and as temporary scratch-pad storage registers for holding computed values.

An object of the present invention is to provide improved and efficient computer apparatus.

A further object of the present invention is to provide an efficient buffer store for use with special purpose digital computers.

Another object of the present invention is to provide an efficient buffer storage which functions both as a buffer store for inputs from the external system to the computer and as temporary scratch-pad storage registers for holding computed values.

Other objects and many of the attendant advantages of this invention will be readily appreciated as the same becomes better understood by reference to the following detailed description when considered in connection with the figures wherein.

Figures 1, 2:
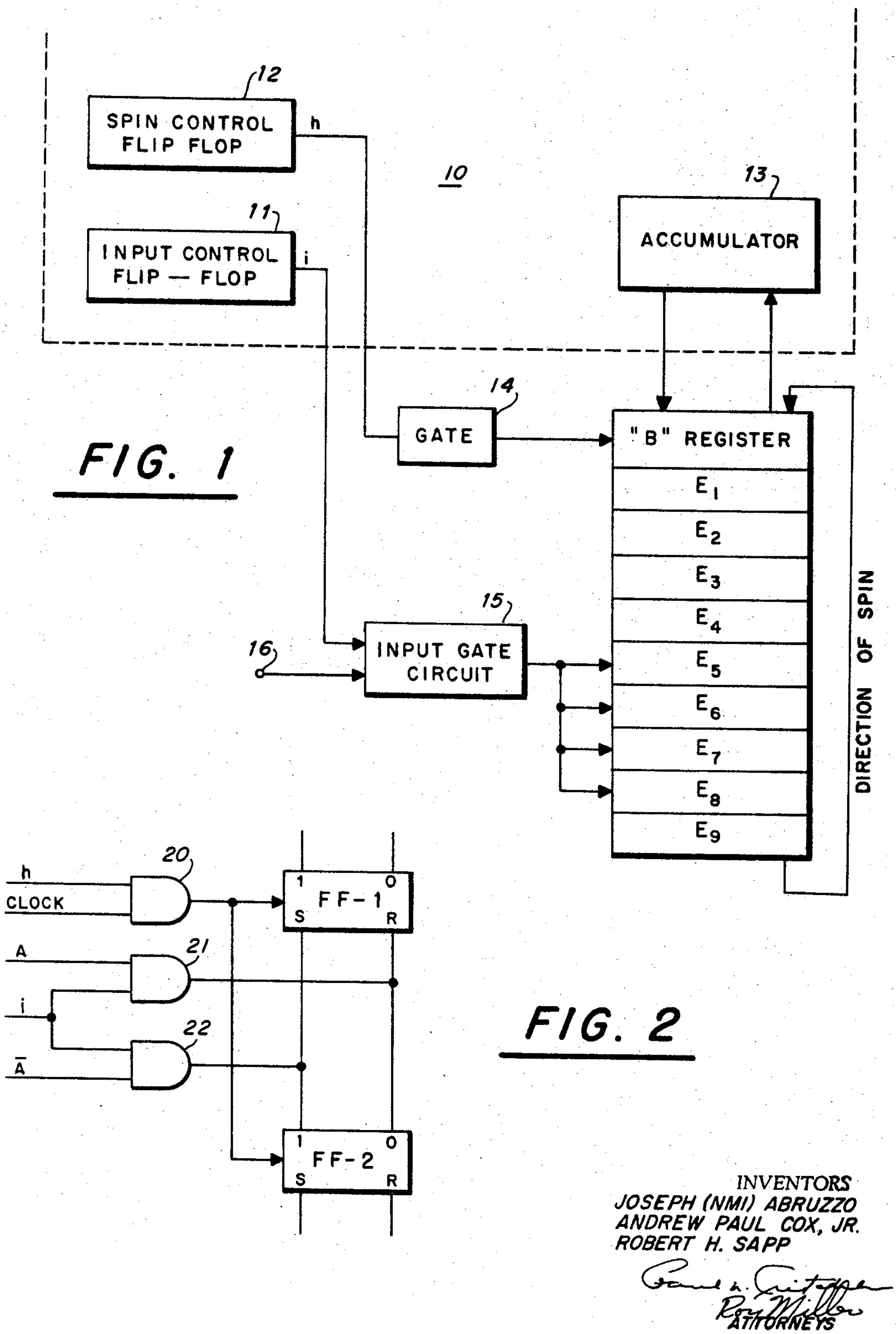
FIG. 1 is a block diagram of the buffer storage and control elements.
FIG. 2 illustrates the circuit logic for the inputting and transfer circuits in the registers.

The computer sub-system described in the present invention is presently being used in the SPADE (Signal Processing and Display Equipment) Stabilization Computer (SSC). Other portions of the SPADE system comprise the SSP (Sonar Signal Preselector), SDD (Sonar Detection Display) and HRD (High Resolution Display).

Provision is made in the present invention for inputting information from the various pieces of equipment in the SPADE system to the buffer storage and at the same time allowing the buffer storage to act as a circulating shift register for holding information.

In FIG. 1 the buffer storage comprises a B register which is a 12 bit register which may accept information in serial or parallel and which outputs in serial or parallel. The buffer storage also includes, in the present example, nine other registers referred to as the E registers ($E_1$–$E_9$) which are all parallel shift registers. The direction of circulation when the buffer storage acts as a circulating shift register is indicated by the closed loop labeled "Direction of Spin."

The B register also functions as an access register, among other things, and communicates with an accumulator or A register 13 contained within an arithmetic and control unit 10 which forms part of the SSC. Also contained within the arithmetic and control unit are an input control flip-flop 11 and a spin control flip-flop 12. The two aforementioned flip-flops comprise a portion of the instruction and address register, not shown. An output from the input control flip-flop 11 labeled *i* is coupled to an input gate circuit 15 which has outputs coupled to the registers E5 through E8. Also coupled to the input gate circuit 15 is an input from an input terminal 16 which receives inputs from the external system components such as the SSP and SDD.

An output from the shift control flip-flop 12 labeled *h* is coupled to a gate 14 the output of which is coupled to the entire buffer store for causing the buffer storage to act as a circulating shift register when the *h* output is present.

FIG. 2 illustrates the specific manner in which information is inputted to the individual flip-flops comprising the buffer registers and the manner in which the information is transferred from register to register when the registers are functioning as a circulating shift register. Two flip-flops only are considered for the purposes of simplifying the explanation, FF–1 and FF–2. Information will be considered to be flowing from FF–2 to FF–1 and information will be considered to be inputted from the external sources to FF–1. FF–2 and FF–1 are arbitrarily labeled at their output lines as "0" and "1" and at the inputs as "set" and "reset."

The "1" output of FF–2 is connected directly to the "set" input of FF–1 while the "0" output is connected to the "Reset" input on FF–1. The *h* input from the spin control flip-flop 12, of FIG. 1, is coupled as one input to an AND gate 20. The other input to AND gate 20 corresponds to an output from the system clock, not shown. The output of AND gate 20 is coupled to FF–1 and FF–2.

The above described circuitry will enable the buffer store to function as a circulating shift register when the enable pulse *h* is present at the input to AND gate 20.

In addition, an enable input *i* from the input control flip-flop 11, of FIG. 1, is coupled as one input to AND gates 21 and 22. AND gate 21 receives another input labeled A while the complement $\overline{A}$ is coupled to AND gate 22. A and $\overline{A}$ correspond to external inputs coupled in at 16.

The output of AND gate 21 is connected to the line connecting the "0" output of FF–2 and the "reset" input on FF–1. The output of AND gate 22 is connected to the line connecting the "1" output of FF–2 and the "set" input of FF–1.

The accumulator 13 is the main arithmetic register of the digital computer. This register is able to right shift or left shift or output or input in parallel.

In general, the buffer store is composed of several registers each of which is capable of shifting (spinning) in a circular fashion through its neighbor as shown in FIG. 1. One of the registers, the B register, is capable not only of parallel shifting but also of supplying inputs to the accumulator and of being used by arithmetic and control unit 10 as an additional arithmetic register.

Spinning is commanded by the arithmetic and control unit 10 and specifically by the spin control flip-flop 12 whenever the spin control flip-flop is in the "1" state. Spinning continues until the state of 12 is changed, regardless of any other instruction which is being executed. The spinning, or shifting, action is controlled by the fast clock input to AND gate 20 in FIG. 2, which turns the buffer clock on or off upon command. The use of a gated clock eliminates the need for gates between flip-flops to effect shifting control and is thus economical in terms of hardware.

Inputting from external source to the registers is performed by pulling down the collectors (output) of the register flip-flop. The state of the flip-flops can thus be changed in the absence of a clock signal. When the input command is given by the state of the input control flip-flop 11, the state of a particular buffer flip-flop is set to a value as determined by the external communicating source. It should be understood, of course, that the information transmitted must be additionally gated by a control line from the source which indicates that the information is ready. In operation, RBN's (Relative Bearing Number) from the SSP are inputted to $E_5$; $V_s$ (Ships Speed) from SDD to $E_6$; $\theta_s$ (Ships Heading) from SSP to $E_7$ and TBN (True Bearing Number or Audio Center Beam Select) from SDD in $E_8$.

The foregoing description sets forth a system wherein the inter-face provided by the B register permits the computer to utilize all of the buffer registers for scratchpad when programmed to do so. At the same time, provision exists for utilizing them as external buffer stores under program control. The system not only provides an efficiently utilizable group of registers, but makes their contents available to the accumulator by relative addressing to control of the number of clock times that a spin lasts, i.e., the contents of any E register may be shifted into the B register wherein they are available to the accumulator. This latter feature further enhances the system by reducing the amount of addressing hardware. Also, in that the spinning is performed in parallel, the access time is not a large factor in the time required for problem solving. In addition, although a certain amount of bookkeeping is required for remembering the buffer contents during program writing, the number of registers required to make the system useful is small enough to make the recording problem not prohibitive.

Obviously many modifications and variations of the present invention are possible in the light of the above teachings. It is therefore to be understood that within the scope of the appended claim the invention may be practiced otherwise than as specifically described.

What is claimed is:

1. An efficient buffer store comprising:

a multiplicity of storage means connected for shifting their contents in a closed loop one from the other;

shift control means having an output connected to said multiplicity of storage means for causing the storage means to shift their contents one from another under the control of the shift control means;

said multiplicity of storage means being parallel shift registers which under the control of the shift control means act as a circulating shift register;

accumulator means having at least one input and output;

one of said shift registers comprising an access register in communication with the accumulator means;

at least one input and output being operatively connected to one of said shift registers comprising an access register for transferring information in parallel into and out of said one of said shift registers;

input control means having an output;

an input terminal operatively connected to receive information from an external source;

coincidence means having inputs and at least one output;

said coincidence means receiving an input from the input control means and the input terminal which receives information from an external source;

said external source comprising information to be inserted into the storage registers;

said coincidence means producing an output when inputs from the input control means and external source are present simultaneously;

said output from the coincidence means being coupled to certain of the storage means in the absence of the shift control input.

References Cited

UNITED STATES PATENTS

| | | | |
|---|---|---|---|
| 2,925,219 | 2/1960 | Nee | 235—165 |
| 3,248,708 | 4/1966 | Haynes | 340—172.5 |
| 3,275,991 | 9/1966 | Schneberger | 340—172.5 |

BERNARD KONICK, *Primary Examiner.*

J. F. BREIMAYER, *Assistant Examiner.*

U.S. Cl. X.R.

340—172.5; 235—165